No. 610,894. Patented Sept. 20, 1898.
G. J. CAPEWELL.
ELECTRIC RAILWAY CAR TRUCK.
(Application filed June 14, 1898.)

(No Model.) 2 Sheets—Sheet 1.

Witnesses:
E. W. Fothergill.
E. J. Hyde.

Inventor:
George J. Capewell, by
Harry R. Williams
Atty.

THE NORRIS PETERS CO., PHOTO-LITHO., WASHINGTON, D. C.

No. 610,894. Patented Sept. 20, 1898.
G. J. CAPEWELL.
ELECTRIC RAILWAY CAR TRUCK.
(Application filed June 14, 1898.)

(No Model.) 2 Sheets—Sheet 2.

Witnesses:
E. W. Fothergill.
E. J. Hyde.

Inventor:
George J. Capewell,
by Harry R. Williams,
atty.

UNITED STATES PATENT OFFICE.

GEORGE J. CAPEWELL, OF HARTFORD, CONNECTICUT.

ELECTRIC-RAILWAY-CAR TRUCK.

SPECIFICATION forming part of Letters Patent No. 610,894, dated September 20, 1898.

Application filed June 14, 1898. Serial No. 683,392. (No model.)

*To all whom it may concern:*

Be it known that I, GEORGE J. CAPEWELL, a citizen of the United States, residing at Hartford, in the county of Hartford and State of Connecticut, have invented certain new and useful Improvements in Electric-Railway-Car Trucks, of which the following is a specification.

This invention relates to a railway-car truck that has traction-wheels arranged one behind the other for traveling on a single central rail track and retaining-wheels arranged on either side of the center for traveling in connection with the rails of a retaining-track.

The object of this invention is the production of a truck of this nature that will be strong in construction and light in weight and that will carry powerful electric motors arranged to drive the truck and a heavy load at a high rate of speed with a minimum expenditure of power and that can be renewed or repaired with facility.

The truck embodying this invention that is illustrated in the accompanying drawings has a pair of centrally-arranged double-flanged traction-wheels, each connected with an axle that upon both sides of the center bears the armature of a motor that is connected with the truck-frame plates, which are supported by the traction-wheel axles and which support the axle of the retaining-wheels, as more particularly hereinafter described, and pointed out in the claims.

Figure 1:
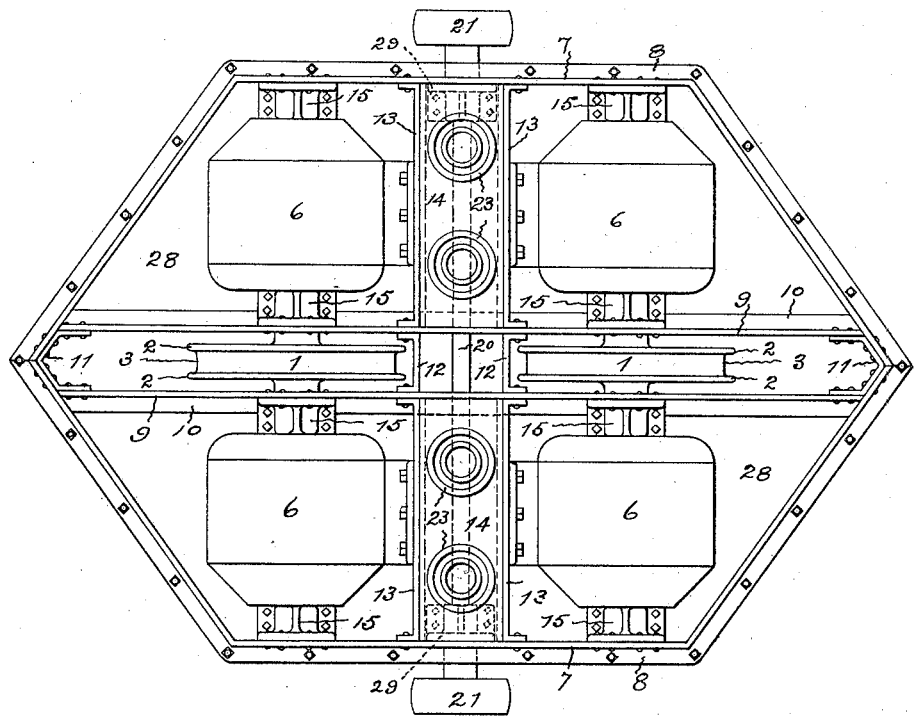
Figure 2:
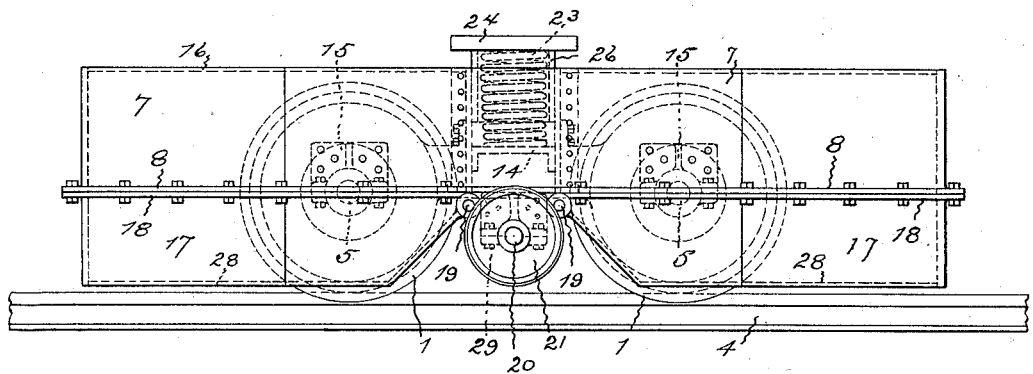
Figure 3:
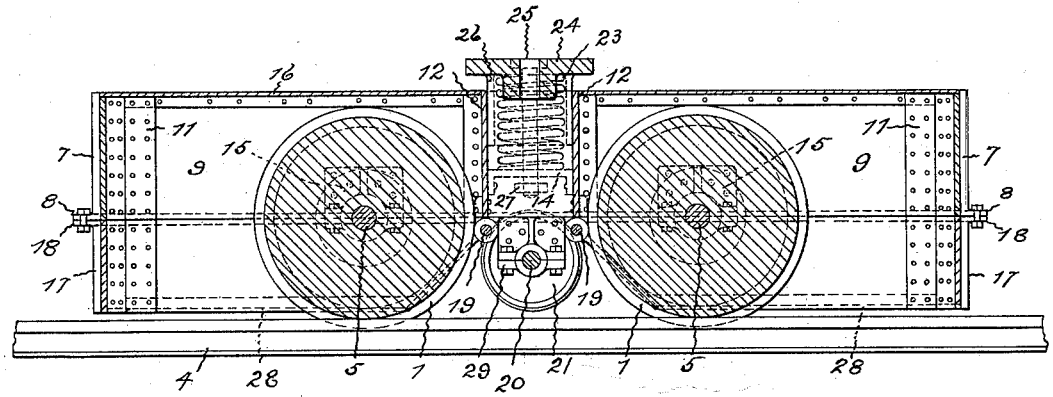
Figure 4:
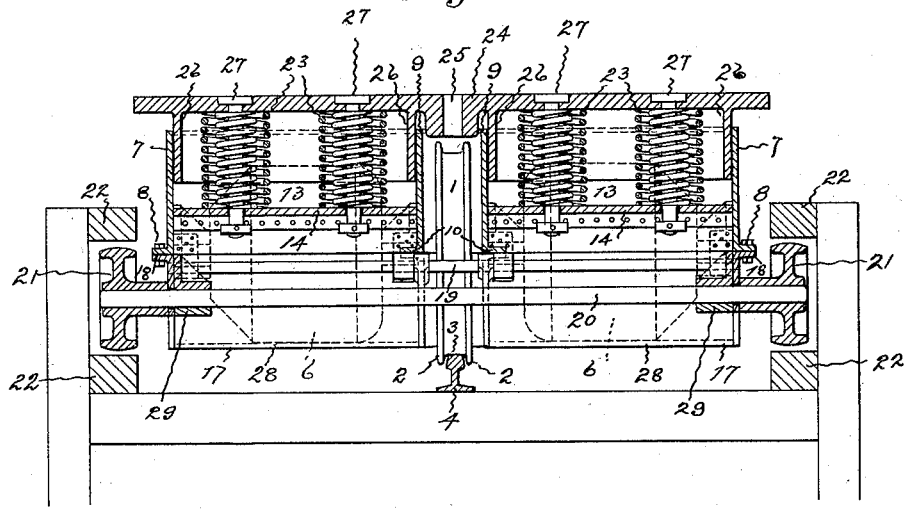

Figure 1 of the drawings shows a plan of this truck with the top plate removed to expose the construction. Fig. 2 shows a side elevation of the truck. Fig. 3 shows a central longitudinal section, and Fig. 4 shows a central transverse section of the same.

Each of the traction-wheels 1, which are arranged in line one behind the other, has flanges 2 on both sides, so that its tread 3 is the bottom of a groove that substantially conforms to the tread of the single rail 4. These wheels are secured in any common manner to axles 5, to each of which on both sides of the center are secured the armatures of the electric motors 6, that are supported concentric with the axles.

The truck-frame is formed of two vertically-arranged metal side plates 7, that extend parallel for some distance and then are bent and converge until they meet at the middle. These side plates 7 have flanges 8 along their lower edges to prevent them from buckling. Extending short distances each side of the center from end to end parallel with each other and with the parallel side plates are vertically-arranged metal center plates 9. The center plates are provided with flanges 10, that prevent them from buckling. The side plates 7 may at their ends be secured together, and the center plates 9 may be secured to the converging walls of the side plates by riveting in place the connection-plates 11. Near the middle the center plates are joined together by transverse vertical plates 12 and are joined with the side plates by transverse vertical plates 13, and the opening between the plates 13 is closed a little distance above their lower edges by horizontal plates 14, which transverse vertical plates and horizontal plates are secured by riveting in a manner customarily employed in putting together platework.

Bearing-boxes 15 are secured to the outside of the center plates 9 and to the inside of the side plates 7. These boxes are so arranged that the lower parts may be removed to permit the placing of the truck-frame upon or the removal of the truck-frame from the axles 5 of the traction-wheels 1. When the truck-frame is in position, with the upper part of the boxes resting upon the axles, the lower parts of the boxes are secured in place, so that the axles cannot get out of the boxes, which are secured to the side and center plates in such positions that they bear upon the axles each side of all of the motors and distribute the weight of the truck-frame and the motors along the axles. When the truck-frame has been placed in position upon the axles of the traction-wheels, the frames of the motors 6 may be bolted to the faces of the transverse plates 13, so that the opening between the field-poles of the motors will be concentric with the armatures on the traction-wheel axles.

A top plate 16 is riveted to the upper edges of the side plates and transverse plates, so as to cover in both ends of the truck-frame and inclose the motors. Secured to the side plates are protector-plates 17, that each side of the middle are closed on the bottom by thin plates 28. The protector-plates 17 are vertically-arranged metal plates with flanges 18 along their upper edges that conform to the parallel sides and converging ends of the side plates 7. The protector-plates are tightly secured to the side plates by bolts passing through the flanges 8 and the flanges 18 and also by hinge-rods 19, that extend transversely of the truck-frame, by which they are supported. When the bolts secure together the flanges 18 of the protector-plates 17 and the flanges 8 of the side plates 7, the motors are entirely closed in, and both ends of the truck will be wedge-shaped, so as to reduce atmospheric resistance to movement to a minimum. If it is desired to get at the motors, the bolts securing together the flanges 8 and 18 are removed and the protector-plates allowed to swing downwardly on their hinge-shafts. Then when the bearing-block caps are loosened the traction-wheels, with their axles and the motors, that of course have been previously loosened from the truck-frame plates, may be removed by lifting the truck-frame from the axles or lowering the axles from the truck-frame.

Bearing-boxes 29 are secured to the side plates near the middle of the truck-frame, and held by these is the axle 20, that on each end beyond the side plates bears the retaining-wheels 21. These retaining-wheels are smaller in diameter than the traction-wheels and are designed to travel between the rails 22 of a retaining-track, so as to prevent the truck from tipping over and the traction-wheels from leaving the central rail 4, upon which they travel.

In the opening between the transverse plates 13 and resting upon the horizontal plates 14 are a number of springs 23. There are shown four sets of springs, each consisting of an outer large-coil spiral spring and an inner small-coil spiral spring. Supported by these springs is the platform-plate 24, that has a central perforation 25 for the king-bolt that connects the platform-plate with the plate that is secured to the under side of the car-bottom. This platform-plate preferably has downwardly-projecting flanges 26, that loosely extend inside of the opening between the transverse plates 13 and the side plates 7 and center plates 9. Headed rods 27 are passed through the springs and through the platform-plate and horizontal plates 14, so as to limit the upward movement of the platform-plate and prevent it from lifting sufficiently for its flanges to get out of the opening into which they extend.

The vertically-arranged plates, braced and connected together in the manner described, form a very light yet strong truck-frame, capable of supporting heavy loads and of receiving motors having a combined capacity of large amount. This truck-frame is so shaped that the atmospheric resistance to its motion is reduced to a minimum, and all strains are so distributed that, although thin plates are employed, the truck-frame will be rigid and the axles will not spring. The motors can be easily reached for renewing or repairs, as necessary, and the car-body will be firmly and yet very yieldingly supported upon this truck, so that the car will travel smoothly and comfortably. Large traction-wheels may be employed, and, running on the central rail, as they do, a maximum amount of tractive effect is insured and high speeds with heavy loads can be maintained without danger that the traction-wheels will leave the track.

I claim as my invention—

1. A car-truck having a pair of central traction-wheels arranged one behind the other to run upon a single-rail track, an axle for each traction-wheel, motors arranged concentric of the axles on each side of each traction-wheel, and a truck-frame with central recesses for the traction-wheels and a closed chamber each side for each motor, supported by the axles, substantially as specified.

2. A car-truck having a pair of central traction-wheels arranged one behind the other to run upon a single-rail track, an axle for each traction-wheel, motors arranged concentric of the axles on each side of each traction-wheel, a truck-frame supported by the axles, and retaining-wheels supported by the truck-frame and arranged to run on each side thereof in connection with a retaining-track of wide gage, substantially as specified.

3. A car-truck having central traction-wheels arranged to run upon a single-rail track, axles for the traction-wheels, motors arranged concentric of the axles on each side of the traction-wheels, vertically-arranged longitudinally-extending plates that are joined together near their ends supported by the axles, vertically-arranged transversely-extending plates bracing the longitudinal plates, and retaining-wheels supported by bearings attached to the longitudinal plates and arranged to run in connection with a retaining-track, substantially as specified.

4. A car-truck having central traction-wheels arranged to run upon a single-rail track, axles for the traction-wheels, motors arranged concentric of the axles on each side of the traction-wheels, a closed truck-frame with parallel sides and pointed ends supported by the axles, and retaining-wheels supported by the truck-frame and arranged to run in connection with a retaining-track, substantially as specified.

5. A car-truck having central traction-wheels arranged to run upon a single-rail track, axles for the traction-wheels, motors arranged concentric of the axles on each side of the traction-wheels, a truck-frame having a closed top supported by the axles of the traction-wheels, a protector-case having a closed bottom secured to the plates of the truck-frame, and retaining-wheels supported by the truck-frame and arranged to run in connection with a retaining-track, substantially as specified.

6. A car-truck having central traction-wheels arranged to run upon a single-rail track, axles for the traction-wheels, motors arranged concentric of the axles on each side of the traction-wheels, vertically-arranged longitudinally-extending side plates that converge and meet at the ends of the truck-frame, vertically-arranged longitudinally-extending center plates that are connected with the side plates near the ends of the truck-frame, vertically-arranged transverse plates bracing the longitudinal plates, horizontal plates in the opening between the transverse plates, springs supported by the horizontal plates, and a platform-plate supported by the springs, substantially as specified.

7. A car-truck having central traction-wheels arranged to run upon a single-rail track, axles for the traction-wheels, motors arranged on each side of the traction-wheels for rotating the axles, vertically-arranged longitudinally-extending plates that are joined together near their ends supported by the axles, vertically-arranged transversely-extending plates bracing the longitudinal plates, and retaining-wheels supported by bearings attached to the longitudinal plates and arranged to run in connection with a retaining-track, substantially as specified.

GEORGE J. CAPEWELL.

Witnesses:
H. R. WILLIAMS,
E. W. FOTHERGILL.